United States Patent
Obrist et al.

(10) Patent No.: US 8,475,587 B2
(45) Date of Patent: Jul. 2, 2013

(54) METHOD OF IMPROVING THE PRODUCT PROPERTIES OF CLINKER IN THE FIRING OF RAW MEAL

(75) Inventors: Albert Obrist, Möriken (CH); Peter Von Zedtwitz, Zürich (CH); Christian Wieckert, Seon (CH)

(73) Assignee: Holcim Technology Ltd., Rapperswil-Jona (CH)

( * ) Notice: Subject to any disclaimer, the term of this patent is extended or adjusted under 35 U.S.C. 154(b) by 104 days.

(21) Appl. No.: 12/735,142

(22) PCT Filed: Dec. 18, 2008

(86) PCT No.: PCT/IB2008/003533
§ 371 (c)(1),
(2), (4) Date: Jul. 19, 2010

(87) PCT Pub. No.: WO2009/090478
PCT Pub. Date: Jul. 23, 2009

(65) Prior Publication Data
US 2010/0282131 A1 Nov. 11, 2010

(30) Foreign Application Priority Data
Dec. 21, 2007 (AT) .................. A 2115/2007

(51) Int. Cl.
*C04B 7/36* (2006.01)

(52) U.S. Cl.
USPC .................. 106/739; 48/209; 48/210

(58) Field of Classification Search
USPC ...................... 106/739; 48/209, 210
See application file for complete search history.

(56) References Cited

U.S. PATENT DOCUMENTS

| | | | | |
|---|---|---|---|---|
| 3,330,324 A | * | 7/1967 | Milligan | 431/328 |
| 3,746,504 A | * | 7/1973 | Solbrig et al. | 432/31 |
| 3,901,645 A | * | 8/1975 | Rowland | 432/16 |
| 3,993,458 A | * | 11/1976 | Antal, Jr. | 48/209 |
| 4,019,896 A | * | 4/1977 | Appleby | 75/581 |
| 4,110,121 A | | 8/1978 | Rechmeier et al. | |
| 4,178,219 A | * | 12/1979 | Abramson et al. | 106/746 |
| 4,229,184 A | * | 10/1980 | Gregg | 48/62 R |
| 4,272,237 A | * | 6/1981 | Smith | 431/328 |
| 4,290,779 A | * | 9/1981 | Frosch et al. | 422/186 |
| 4,415,339 A | * | 11/1983 | Aiman et al. | 48/62 R |
| 4,425,092 A | | 1/1984 | Brachthauser et al. | |
| 4,604,054 A | * | 8/1986 | Smith | 431/328 |
| 4,730,599 A | * | 3/1988 | Kendall et al. | 126/91 A |
| 4,883,423 A | * | 11/1989 | Holowczenko | 431/328 |
| 5,308,187 A | * | 5/1994 | Nix | 404/17 |

(Continued)

FOREIGN PATENT DOCUMENTS

| | | |
|---|---|---|
| CH | 692 927 A5 | 12/2002 |
| DE | 25 19 022 A1 | 11/1976 |

(Continued)

*Primary Examiner* — Paul Marcantoni
(74) *Attorney, Agent, or Firm* — Chapman and Cutler LLP

(57) ABSTRACT

Method of improving the product properties of clinker in the firing of raw meal in a clinker or cement furnace in which at least part of the fuels used are low-heating-value or alternative fuels, waste products containing organic substances or low-heating-value or alternative fuels are subjected to thermal dissociation and reaction of the dissociation products using radiant energy. The product gas or synthesis gas formed in this way is fed to the burners of the main firing facility to increase the flame temperature.

19 Claims, 1 Drawing Sheet

U.S. PATENT DOCUMENTS

| | | | | |
|---|---|---|---|---|
| 5,647,877 A * | 7/1997 | Epstein | | 48/210 |
| 6,510,695 B1 | 1/2003 | Fisher | | |
| 6,670,058 B2 * | 12/2003 | Muradov | | 429/412 |
| 7,033,570 B2 * | 4/2006 | Weimer et al. | | 423/650 |
| 7,128,005 B2 * | 10/2006 | Carter et al. | | 110/233 |
| 8,062,029 B2 * | 11/2011 | Schweinitz et al. | | 432/175 |
| 2005/0192362 A1 * | 9/2005 | Rodriguez et al. | | 518/702 |
| 2007/0098602 A1 * | 5/2007 | Haueter et al. | | 422/186 |
| 2008/0020334 A1 * | 1/2008 | Joshi et al. | | 431/2 |
| 2008/0086946 A1 * | 4/2008 | Weimer et al. | | 48/89 |
| 2008/0131830 A1 * | 6/2008 | Nix | | 432/220 |
| 2010/0129691 A1 * | 5/2010 | Dooher et al. | | 429/17 |
| 2010/0305221 A1 * | 12/2010 | Schunk et al. | | 518/704 |

FOREIGN PATENT DOCUMENTS

| | | |
|---|---|---|
| DE | 26 27 056 A1 | 12/1977 |
| DE | 27 48 510 A1 | 5/1978 |
| EP | 0 548 889 A1 | 6/1993 |
| EP | 0548889 A1 * | 6/1993 |
| GB | 2 128 722 A | 5/1984 |

* cited by examiner

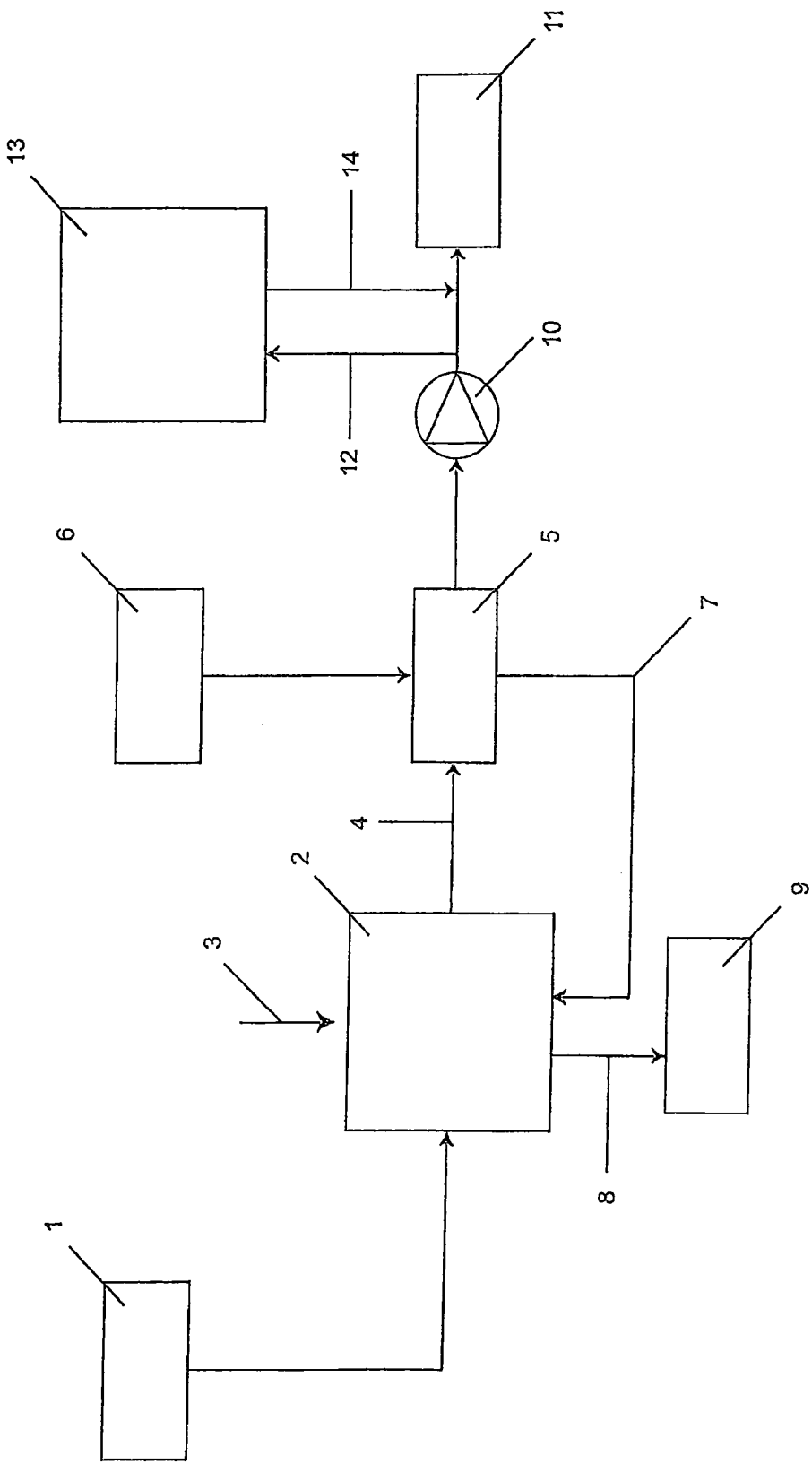

METHOD OF IMPROVING THE PRODUCT PROPERTIES OF CLINKER IN THE FIRING OF RAW MEAL

The invention relates to a method for improving the product properties of clinker in the firing of raw meal in a clinker or cement furnace, in which at least part of the fuels used are alternative fuels.

Large quantities of fuel are required in order to operate clinker or cement furnaces, and several attempts have been made to use lower heating value fuels in this field, in order to lower costs. However, the use of lower heating value fuels is associated with a number of drawbacks. For example, replacing high-quality coal with lower heating value fuels causes the burner temperatures in the sintering zone or the main firing facility to be lowered from 2000° C. to less than 1600° C., even though significant disadvantages in the clinkering process are already observed at temperatures below 1800° C. Lowering the temperature by 200 to 300° C. in the area of the burner by using lower-quality fuels, and particularly by the use of alternative fuels results in a less favourable temperature profile along the longitudinal axis of the rotary kiln, and more often than not causes the temperature peak, which ideally extends over a short area, to extend over a longer area but at a considerably lower value. The lower quality of clinker observed in this context relates mainly to the clinker reactivity. The standard used to measure this reactivity is the reactivity index, which is defined as Blaine divided by the early strength after one day. The use of lower heating value fuels also leads to a reduction in tons of production capacity per day, and an increase in the heat requirement.

Gasification reactors have already been suggested as a method to improve the usability of alternative fuels. Methods and devices by which alternative fuels may by introduced directly into the furnace at certain points in the cement pyroprocess are known, although such an approach has the inherent disadvantage that the remaining ash components from alternative fuels and other residues have uncontrollable effects (chemical and mineralogical fluctuation) on the quality of the clinker. It has also been suggested in the past to use separate gasification reactors, although such reactors themselves draw the heat they need from partial combustion, thus diluting the product gas or low temperature carbonisation gas with combustion gases, and consume a portion of the calorific value of the fuels.

In principle, it has already been established that carbon-containing fuels such as petroleum coke can be gasified particularly advantageously by using radiant energy. In this context, a method in which concentrated solar energy is used as a heat source for producing synthesis gas from a number of alternative fuels has been disclosed in EP 548889. According to the method described in that document, it was discovered that higher-quality product gases may be obtained by using solar energy than by conventional coal gasification using steam.

In simplified form, gasification in a solar reactor takes place in the presence of steam according to the equation $CH_xO_y + H_2O \rightarrow CO + H_2$. However, this equation is a massive simplification of the actually prevailing conditions, as they exist in equilibrium at various temperatures, wherein the following individual reactions in this context are particularly important: steam gasification according to the equation $C_{(gr)} + H_2O = CO + H_2$ is of course superposed by the Boudouard equilibrium according to the equation $2\ CO = C_{(gr)} + CO_2$ and side reactions in which for example methane is formed from carbon according to the equation $C_{(gr)} + 2\ H_2 = CH_4$. A reforming reaction takes place according to the equation $CH_4 + H_2O = CO + 3H_2$, and finally the $CO/CO_2$ equilibrium may even be shifted with steam, for which the equation $CO + H_2O = CO_2 + H_2$ is characteristic. All of these equilibrium reactions take place more readily at different temperatures, the quality of the synthesis gas obtained of course being essentially determined by the ratio of $H_2$ to CO and the ratio of $CO_2$ to CO. The shift of the $H_2$ to CO ratio may be achieved particularly easily with steam at temperatures from 550 to 750° C. At temperatures below 550° C., graphite, methane, $CO_2$ and $H_2O$ are thermodynamically stable. An essentially uniform phase is only obtained from $H_2$ and CO at considerably higher temperatures.

The present invention now takes all of these theoretical conditions as its starting point with the aim of rendering alternative fuels usable in particularly advantageous manner to improve the product properties of clinker when raw meal is fired. Until now, only classic, autothermal gasification, reactors have been suggested or the steps described in the introduction in which alternative fuels were introduced directly into the clinker furnace, have been taken with respect to burning raw meal. Accordingly, in order to solve the object underlying the invention, the inventive method consists in subjecting waste products containing organic substances or alternative fuels to thermal dissociation and reacting, in other words gasifying, the dissociation products using radiant energy, and feeding the product gas or synthesis gas formed in this way is to the burners of the main firing facility to increase the flame temperature. Now, since the gasification reaction of the waste products, or alternative fuels is powered by radiant energy, there is no loading with excess combustion gases and the energy content increases due to the radiant energy absorbed, giving rise to a significantly higher quality product gas, which is characterized by a low quantity of combustion gas per unit of energy. This product gas or synthesis gas is therefore suitable for raising the flame temperature and a corresponding fraction thereof may be fed to the burners in order to improve the clinkering process and the temperature profile over the clinker furnace.

In this context, the method according to the invention is carried out particularly advantageously in such manner that the product gas, or synthesis gas, is fed to the burners of the main firing facility to increase the flame temperature in quantities from 5 to 50% of the energy fraction relative to the energy content introduced.

In principle, the synthesis gas produced in this way is used in a manner that contradicts the view of the expert community, which has overwhelmingly held that it is not possible to achieve a sufficient degree of conversion for economical production using alternative fuels with solar gasifiers. This view, as expressed for example in EP 548889, has been refuted particularly by proceeding for the purposes of the present invention such that the alternative fuels are used in a solar gasification reactor in the form of a bulk material having a maximum particle size of 250 mm, preferably 200 mm to produce a synthesis gas. Whereas the known methods for using alternative fuels in solar gasifiers required prohibitively expensive preparation of the material, and particularly a corresponding size reduction in order to create a fluidised bed, or to prepare suspensions that would enable the alternative fuels to be injected into the reactor, the method according to the invention succeeds with an extremely simple preparation of the fuels, wherein it has been possible to demonstrate according to the invention that the addition of water or steam may even be at least partially dispensed with especially when lower-quality products containing a high proportion of readily volatile or vaporisable substances are used, because the requisite quantity of steam is formed directly from the moisture in the starting products, and synthesis gas (essentially CO and $H_2$) is formed directly by a reaction of the H and O bound in the starting product. This is true for example of damp coals or when sludges are used as alternative fuels. By dispensing with large quantities of steam, such as are used in the conventional production of synthesis gas in solar reactors, the quality of the product gas is further improved and it is endowed with the desired properties that enable it to be used to increase the flame temperature. In this context, the method is conducted particularly advantageously such that thermal dissociation of the alternative fuels takes place at temperatures of above 700° C., preferably from 850° C. to 1300° C., wherein these temperatures represent an optimum for the purposes of producing the desired $CO/H_2$ mixture.

As was indicated in the preceding, if necessary $H_2O$ (steam) may be added to ensure almost complete conversion of the products of dissociation into $H_2$+CO (synthesis gas), in which case, it was surprisingly discovered that in many cases steam does not need to be added in this way at all if steam is generated by the process of thermal dissociation itself, when damp coals or sludges or suchlike are used in the method.

According to the invention, the method for improving the product properties of clinker is advantageously carried out in such manner that the synthesis gas is fed to the burners of the main firing facility in a quantity that is required to raise the flame temperature by an amount of 50° C. to 200° C., wherein the synthesis gas is preferably generated under essentially no pressure, cooled to temperatures below 550° C., preferably below 500° C., and transported to the burner lances via a fan. In particular, the production of the synthesis gas without pressure enables the use of very simple facilities in which the alternative fuels may be used in the form of bulk material having relatively large particle sizes, wherein good conversion is still achieved with unpressurised production even at correspondingly lower temperatures.

The method is preferably performed in such manner that the burner or flame temperature is set to values above 1700° C., preferably 1800° C. to 2000° C., with the synthesis gas.

In order to ensure that the method according to the invention does not impair the clinker quality, it may subsequently be decided, depending on the nature of the starting products and the chemical composition of the solid residues, how such solid residues are to be processed further. This may be effected particularly simply if the solid residues remaining after gasification in the solar gasification reactor are extracted separately, and used as desired as the raw material component for processing the raw meal, or added to the cement as a mixing component.

As was mentioned the preceding, any low-quality or alternative fuels may be used within the scope of this method according to the invention, and sludges and waste materials with high components of readily volatile or vaporisable substances have proven to be particularly suitable for use as alternative fuels. However, the advantages may also be realised for conventional fuels such as low-grade coals, cokes, and biomasses.

With the method according to the invention, it is possible to increase the strength of the product obtained (cement) without increasing the grinding fineness correspondingly, which yields the advantage that only a relatively low water/cement ratio is required to produce concrete. The correspondingly increased reactivity thus leads to important advantages in the subsequent processing of the product. In this context, for example, the production capacity of a furnace system with precalciner may be increased by 3 to 4% by replacing about 50% of the energy needed in the main firing facility with the synthesis gas of the invention, while at the same time reducing the total energy requirement by 1 to 2% and lowering $CO_2$ emissions from the fuels by as much as 9%. The product gases have to be cooled down suitably for the fans that are used to assure the requisite increase in pressure after the unpressurised synthesis gas production, so that investment in the fans is kept as low as possible, and cooling of this nature to temperatures below 500° C. may be effected particularly easily, for example by using contaminated water, which is converted into impure steam via a heat exchanger and then fed into the gasification reactor. IN this context, the essential difference from conventional combustion in the main firing facility consists in that it is possible to dispense with the size reductions to the usual particle sizes of less then 5 mm, particularly between 2 to 5 mm. Additionally, it is possible to use a variety of true waste materials, which previously did not lend themselves to use in the main firing facility due to their properties (water content, consistency). The requisite steam component in the production of synthesis gases may be kept low in, the context of the method according to the invention because the steam gasification of carbon contributes significantly less to production of synthesis gas than does the conversion of the starting substances, which consist essentially of hydrocarbons. However, steam must always be added in a corresponding stoichiometric quantity in order to convert the volatile substances into CO and $H_2$.

If sufficient quantities of low heating value fuels are available for a gasification reaction and the radiant energy in the form of concentrated solar energy can be assured, the high-quality product' gases may be stored as required and also made available for other applications, such as use in a precalciner. At this point, however, the requirements regarding fuel quality are no longer directly comparable with the requirements regarding the flame temperature in the cement furnace. The steam component required for gasification may preferably be recovered by extracting the heat using contaminated water when the product gas is cooled.

The invention will be explained in greater detail in the following with reference to a schematic illustration in the drawing of an embodiment of a device for carrying out the method according to the invention.

In the drawing, the feed hopper for low heating value or alternative fuels is identified with the number 1. The material passes into a solar reactor 2, in which concentrated solar energy is provided as shown schematically by arrow 3. The product gas formed thereby passes through a pipe 4 at temperatures of about 1100° C. into a heat exchanger 5, to which water, particularly contaminated water, may be introduced into solar reactor 2 from a tank 6 as steam via pipe 7. Ash may be removed via a pipe 8 and fed to a mill 9. The product gas, which is cooled to temperatures of about 500° C., is forwarded to the burners of a rotary furnace 11 by a fan 10, and quantities of gas that are excess to requirements may be transported via a pipe 12 to a storage facility and returned to rotary furnace 11 via pipe 14.

The invention claimed is:

1. A method of producing a product gas or synthesis gas to use as a fuel in a clinker or cement furnace, comprising the steps of:

in a solar gasification reactor, subjecting to radiant energy at least one of alternative fuels, low-heating-value fuels, and waste products containing organic substances to cause thermal dissociation thereof at temperatures of more than 700° C., to produce a product gas or synthesis gas, and feeding said product gas or synthesis gas to burners of the clinker or cement furnace to increase flame temperature.

2. The method according to claim 1, wherein said product gas or synthesis gas is fed to the burners of the clinker or cement furnace in an amount of 5 to 50% of an energy content of fuels used for the burners of the clinker or cement furnace, to increase the flame temperature.

3. The method according to claim 1, wherein at least one of the alternative fuels, low-heating-value fuels, and waste products containing organic substances is a bulk material having a maximum particle size of 250 mm.

4. The method according to claim 1, wherein steam is added to aid the thermal dissociation to hydrogen as and carbon monoxide gas.

5. The method according to claim 1, wherein the product gas or synthesis gas is fed to the burners of the clinker or cement furnace in an amount effective to increase the flame temperature between 50° C. to 200° C.

6. The method according to claim 1, wherein the product gas or synthesis gas is produced at ambient pressure, cooled to temperatures below 550° C., and transported to burner lances of the clinker or cement furnace by a fan.

7. The method according to claim 1, wherein the flame temperature of the clinker or cement furnace is adjusted to values above 1700° C. using the product gas or synthesis gas.

8. The method according to claim 1, wherein solid residues in the solar gasification reactor after production of the product gas or synthesis gas are extracted separately and added to cement as a raw material component or mixing component.

9. The method according to claim 1, wherein at least one of the alternative fuels, low-heating-value fuels, and waste products containing organic substances are sludges or waste having high contents of volatile or vaporisable substances.

10. The method according to claim 1, wherein concentrated solar energy is the radiant energy source.

11. The method according to claim 10, wherein at least a part of the product gas or synthesis gas produced while sun is shining is stored temporarily, and used as a source of supplementary fuel for combustion in the clinker or cement furnace.

12. The method according to claim 1, wherein steam to aid production of the product gas or synthesis gas is generated by recovering heat during cooling of the product gas or synthesis gas.

13. The method according to claim 1, wherein at least one of the alternative fuels, low-heating-value fuels, and waste products containing organic substances is a bulk material having a maximum particle size of 200 mm.

14. The method according to claim 2, wherein said at least one of alternative fuels, low-heating-value fuels, and waste products containing organic substances is a bulk material having a maximum particle size of 250 mm.

15. The method according to claim 1, wherein the thermal dissociation is carried out at 850° C. to 1300° C.

16. The method according to claim 2, wherein the thermal dissociation is carried out at 850° C. to 1300° C.

17. The method according to claim 2, wherein steam is added to aid the thermal dissociation to hydrogen as and carbon monoxide gas.

18. The method according to claim 1, wherein the product gas or synthesis gas is produced at ambient pressure, cooled to temperatures below 500° C., and transported to burner lances of the clinker or cement furnace by a fan.

19. The method according to claim 1, wherein the flame temperature of the clinker or cement furnace is adjusted to values of 1800° C. to 2000° C. using the product gas or synthesis gas.

* * * * *